United States Patent [19]

Alattar

[11] Patent Number: 5,245,436
[45] Date of Patent: Sep. 14, 1993

[54] METHOD AND APPARATUS FOR DETECTING FADES IN DIGITAL VIDEO SEQUENCES

[75] Inventor: Adnan M. Alattar, Plainsboro, N.J.

[73] Assignee: Intel Corporation, Santa Clara, Calif.

[21] Appl. No.: 836,108

[22] Filed: Feb. 14, 1992

[51] Int. Cl.$^5$ .......................................... H04N 5/262
[52] U.S. Cl. ..................................... 358/182; 358/185
[58] Field of Search ................ 358/182, 183, 185, 22, 358/105

[56] References Cited

U.S. PATENT DOCUMENTS

| | | | |
|---|---|---|---|
| 3,970,774 | 7/1976 | Bazin et al. ..................... | 358/182 X |
| 4,198,653 | 4/1980 | Kamin ............................. | 358/108 X |
| 4,218,704 | 8/1980 | Netravali et al. ................ | 358/136 |
| 4,233,631 | 11/1980 | Mahler ............................ | 358/182 |
| 4,340,903 | 7/1982 | Tamura .......................... | 358/182 X |
| 5,151,945 | 9/1992 | Lee et al. ........................ | 358/105 X |

FOREIGN PATENT DOCUMENTS

| | | | |
|---|---|---|---|
| 0079772 | 5/1982 | Japan ................................. | 358/182 |
| 0128779 | 7/1985 | Japan ................................. | 358/182 |

*Primary Examiner*—Victor R. Kostak
*Attorney, Agent, or Firm*—Carl L. Silverman; William H. Murray; Daniel H. Golub

[57] ABSTRACT

A method and apparatus for detecting a fade within a sequence of digital motion video frames. A first frame and a previous frame are selected from the sequence as first and second regions, respectively, for processing. The mean of the first region and the mean of the second region are each calculated and the relative mean change between the means is determined. A fade is detected if the relative mean change exceeds a first predetermined threshold. Alternatively, a fade is detected if the relative mean change is less than the first predetermined threshold but greater than a second predetermined threshold and the magnitude of the difference between the means is greater than a third predetermined threshold.

27 Claims, 2 Drawing Sheets

METHOD AND APPARATUS FOR DETECTING FADES IN DIGITAL VIDEO SEQUENCES

FIELD OF THE INVENTION

This invention relates to video signal processing generally and particularly to systems for providing a compressed digital video signal representative of a full color video signal.

BACKGROUND OF THE INVENTION

It is common practice in video production to use a fade region to start or end a scene. When such a region is used at the beginning of a scene it is called fade-in, but when it is used at the end of a scene it is called fade-out. In a fade-in region, the scene gradually appears while a solid color such as black or white gradually fades out, and by the end of this region, the scene completely replaces the solid color. Similarly, in a fade-out region the scene gradually fades out, while a solid color such as black or white fades in, and by the end of this region the solid color completely replaces the scene. Although a fade region can be up to several seconds long, fades of $\frac{1}{2}$ to 1 second are more common in video production. When the same process occurs between two different scenes it is called a dissolve. Although fades can be considered a special case of dissolves, only fades are addressed in this application.

Attempting to compress a fade region via image compression using a typical motion compensation algorithm results in a high entropy prediction error image. Encoding such an image requires more bits than usual, which may not be affordable for all of the fade region without increasing the average bit-rate. Furthermore, an image that is encoded with an insufficient number of bits appears blocky when it is decoded. Similar problems occur whenever a scene contains a rapid but non-uniform change in the overall luminosity from one frame to another due to an explosion or a flash bulb. In this application, such a luminosity change will also be referred to as a fade. The blockiness due to the luminosity difference between the images of a scene can be avoided by first detecting those frames with luminosity difference, and then encoding them in a special way.

It is therefore an object of the present invention to provide a system for detecting fades and rapid changes in overall luminosity within digital video sequences.

Further objects and advantages of the invention will become apparent from the description of the invention which follows.

SUMMARY OF THE INVENTION

The present invention is directed to a method and apparatus for detecting a fade within a sequence of digital motion video frames wherein first and second frames are selected from the sequence for processing and a first luminosity difference value is determined from the selected frames. A fade is detected by comparing the first luminosity difference value to a predetermined threshold. In the preferred embodiment, a frame to be processed and a previous frame are selected from the digital motion video frame sequence as first and second regions, respectively, for processing. A value representing the mean ($M_1$) of all pixel values in the first region is calculated, and a value representing the mean ($M_2$) of all pixel values in the second region is calculated. The magnitude of the difference (D) between $M_1$ and $M_2$ and the relative mean change ($m_r$) between $M_1$ and $M_2$ are determined. The relative mean change ($m_r$) is determined by dividing D by $M_1$. The relative mean change ($m_r$) is then compared to a first predetermined threshold ($T_1$). A fade is detected if $m_r$ exceeds $T_1$. In this embodiment, $m_r$ may represent a first luminosity difference value.

In an alternate embodiment of the present invention, a frame to be processed and a previous frame are again selected from the digital motion video frame sequence as first and second regions, respectively, for processing. The mean ($M_1$) of the first region and the mean ($M_2$) of the second region are calculated. The difference (D) between $M_1$ and $M_2$ and the relative mean change ($m_r$) between $M_1$ and $M_2$ are then determined. The relative mean change ($m_r$) is compared to a first predetermined threshold ($T_1$) and to a second predetermined threshold ($T_2$), $T_2$ being smaller than $T_1$. D is compared to a third predetermined threshold ($T_3$). A fade is detected if $m_r$ is less than $T_1$ but greater than $T_2$, and D is greater than $T_3$. In this embodiment, $m_r$ and D may represent first and second luminosity difference values.

In a further alternative embodiment, the fade detector of the present invention is adapted to not signal fades if the mean ($M_1$) of the first region is less than a fourth predetermined threshold ($T_4$) or greater than a fifth predetermined threshold ($T_5$).

In a still further embodiment, if after processing a selected frame as a single region a fade is detected, the selected frame is divided into several regions and a fade detection process is repeated with respect to each region. If the number of divided regions in the selected frame for which a fade is detected exceeds a predetermined percentage, the selected frame is flagged as a fade frame.

In a still further embodiment, a post-processing stage may be added after all frames in a sequence have been processed to "unflag" certain flagged fade frames which do not require special handling during encoding. Also in this stage, certain single or isolated frames which were not flagged but lie within a fade range may be flagged to enhance detection.

DETAILED DESCRIPTION OF THE PREFERRED EMBODIMENT

Figure 1:
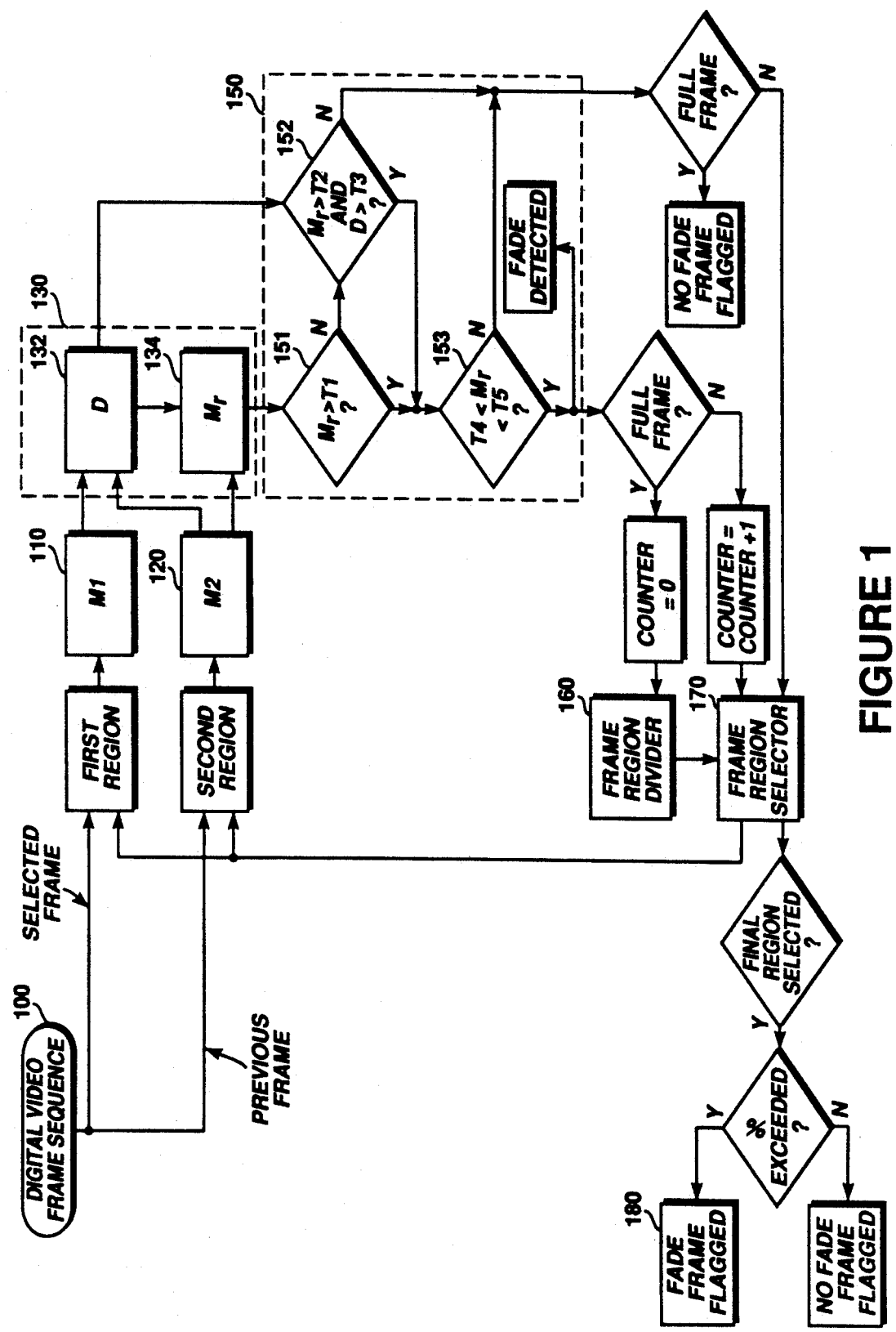
FIG. 1 is a flow diagram illustrating the operation of a preferred embodiment of the present invention.

Referring now to FIG. 1, there is shown a flow diagram illustrating the operation of a fade detector according to a preferred embodiment of the present invention. The fade detector includes means 100 for providing first and second frames from a sequence of digital motion video frames for processing. In the embodiment shown, a selected frame and a frame preceding said selected frame (a previous frame) are provided by means 100 as first and second regions, respectively, for processing. First calculating means 110 for calculating the mean ($M_1$) of said first region and second calculating means 120 for calculating the mean ($M_2$) of said second region may also be provided. First calculating means 110 calculates the arithmetic mean of all pixel values in said first region, and second calculating means 120 calculates the arithmetic mean of all pixel values in said second region. The fade detector also includes means 130 for determining at least one luminosity difference value from said first and second frames. In the embodiment shown, means 130 includes means for determining two luminosity difference values. More particularly, in the preferred embodiment means 130 is comprised of difference mean 132 for determining the magnitude of the difference (D) between the mean of said first region and the mean of said second region by subtracting $M_2$ from $M_1$ and taking the absolute value, and relative difference means 134 for determining the relative mean change ($m_r$) between said first region and said second region by dividing D by $M_1$.

The fade detector of FIG. 1 also includes fade detector means 150 for determining the presence of a fade by comparing at least one luminosity difference value to at least one predetermined threshold. In the embodiment shown, fade detector means 150 includes first comparing means 151 for comparing $m_r$ to a first predetermined threshold ($T_1$), second comparing means 152 for comparing $m_r$ to a second predetermined threshold ($T_2$) and for comparing D to a third predetermined threshold ($T_3$), and third comparing means 153 for comparing $M_1$ to fourth ($T_4$) and fifth ($T_5$) predetermined thresholds. In the preferred embodiment, $T_2$ is smaller than $T_1$.

In the preferred embodiment shown, fade detector means 150 detects the presence of a fade by first determining if either ($m_r > T_1$) or (($m_r > T_2$) and (D $> T_3$)) is satisfied. If either of these conditions is satisfied, fade detector means 150 next determines if the condition ($T_4 < M_1 < T_5$) is satisfied and, if so, determines a fade to be present. In an alternate embodiment, fade detector means 150 may look only to the condition ($m_r > T_1$) and may determine a fade to exist if this condition alone is satisfied. In a still further alternate embodiment, fade detector means 150 may look only to the condition (($m_r > T_2$) and (D$> T_3$)) and may determine a fade to exist if this condition alone is satisfied. In a still further alternate embodiment, fade detector means 150 may look only to the conditions ($m_r > T_1$) and ($T_4 < M_1 < T_5$) and may determine a fade to exist only if both these conditions are satisfied. Finally, fade detector means 150 may alternately look only to the conditions (($m_r > T_2$) and (D $> T_3$)) and ($T_4 < M_1 < T_5$) and may determine a fade to exist only if both these conditions are satisfied.

In the preferred embodiment, it is next determined whether the first region being processed is a full frame. If the first region was a full frame and fade detector means 150 did not determine a fade to be present, then the selected frame is not flagged as a fade frame. If the first region was a full frame and fade detector means 150 did determine a fade to be present, then a counter is initialized to zero and frame dividing means 160, for dividing said selected frame and said previous frame into corresponding regions, partitions said selected frame and said previous frame into corresponding regions. In the preferred embodiment, frame dividing means 160 partitions said selected and previous frames into equal quarters. Frame region selection means 170, for selecting regions of said selected and previous frames for processing, selects a region of said selected frame as the first region for processing and a corresponding region of said previous frame as the second region for processing. Based on the substituted first and second regions for processing, first calculating means 110, second calculating means 120, difference means 132, relative difference means 134, and fade detector means 150 repeat the processes described above to determine whether a fade is present. If a fade is found to be present, the counter is incremented. The process is then repeated for all remaining regions in the selected and previous frames. Once all regions in the selected and previous frames have been processed, fade frame flagging means 180 for flagging a selected frame as a fade frame, flags the selected frame as a fade frame if the counter divided by the number of regions in which the selected and previous frames were partitioned into exceeds a predetermined percentage.

The present invention has been implemented using an Intel model i860 parallel processor. Suitable values for the thresholds T1, T2, T3, T4 and T5 have been chosen as 0.03, 0.05, 3, 17 and 200, respectively.

In an alternate embodiment (not shown), the present invention may detect or flag a selected frame as a fade based only on an analysis of unpartitioned frames by means 130 for determining at least one luminosity difference value and fade detector means 150. In a still further embodiment (not shown) a selected frame may be detected or flagged as a fade based only on an analysis of unpartitioned frames by first calculating means 110, second calculating means 120, difference means 130, relative difference means 140, and fade detector means 150. According to these embodiments, a selected frame may flagged as fade frame if detector means 150 detects the presence of a fade.

Figure 2:
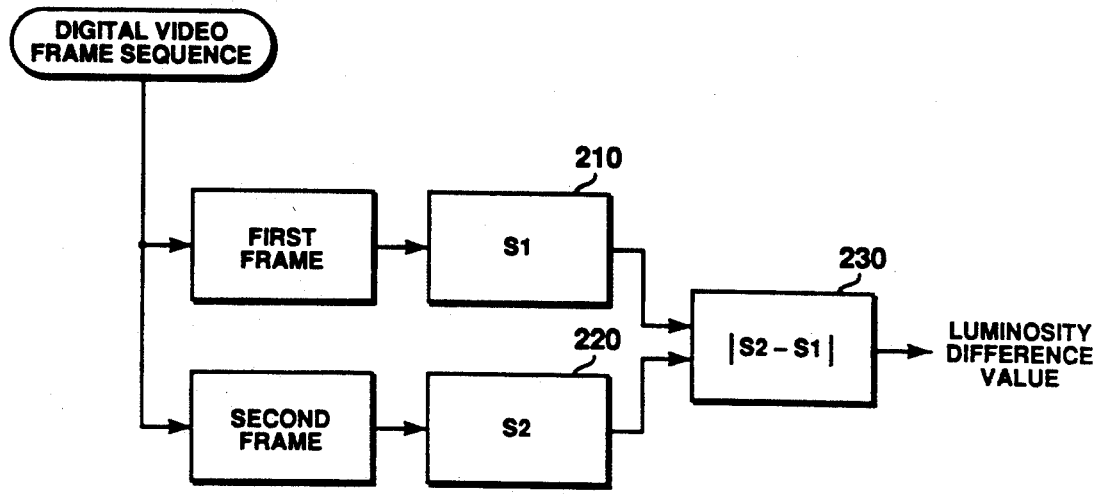
FIG. 2 is a flow diagram illustrating the calculation of a luminosity difference value according to an alternate embodiment of the present invention.
Figure 3:
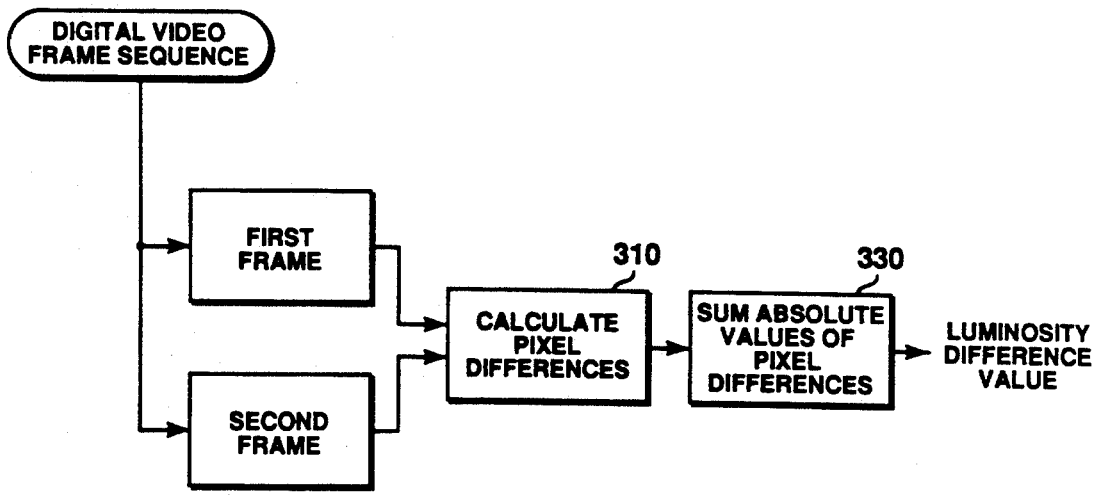
FIG. 3 is a flow diagram illustrating the calculation of a luminosity difference value according to a further alternate embodiment of the present invention.

In the preferred embodiment described above, a relative mean change ($m_r$,) represented a luminosity difference value calculated by means 130; the magnitude of the difference (D) represented a second luminosity difference value calculated by means 130. In alternate embodiments, one or more of such luminosity difference values may be calculated in other ways. For example, as shown in FIG. 2, a luminosity difference value may represent the absolute value of the difference between the sum of pixel values in a first frame (S1) and the sum of pixel values in a second frame (S2). In the embodiment shown in FIG. 2, means 210, 220 are provided for calculating S1, S2, respectively, and means 230 is provided for calculating the absolute value of the difference between S1 and S2. In addition, as shown in FIG. 3, a luminosity difference value may represent the sum of the absolute value of differences determined by comparing first and second frames on a pixel-by-pixel basis. In the embodiment shown in FIG. 3, means 310 is provided for determining on a pixel-by-pixel basis the differences between first and second frames. Means 330 is provided for summing the absolute values of the differences determined by means 310. Other luminosity difference values representing changes or variations in luminosity between frames may also be used.

The luminosity difference values calculated in the preferred embodiment ($m_r$ and D) were derived directly from the mean ($M_1$) of all pixel values in a first frame and from the mean ($M_2$) of all pixel values in a second frame. These first and second frames were provided from a sequence of digital motion video frames. In alternate embodiments, a luminosity difference value may be calculated based on error images, difference images, or other images which are themselves derived from images in a sequence of digital motion video frames. Also, it is to be understood that the luminosity difference values may be determined in their first instance based only on regions or portions of the selected frames, as opposed to an analysis of those frames as a whole.

In a further aspect of the present invention, a post-processing stage is added after all frames in the sequence have been processed to "unflag" certain flagged fade frames which do not warrant special handling during encoding. In this stage, each flagged fade frame is analyzed to determine whether it constitutes a single (or isolated) fade frame. The relative mean change between each single fade frame and a previous frame is then calculated and compared against a sixth predetermined threshold ($T_6$). A single fade frame is "unflagged" if the magnitude of the relative mean change is less than $T_6$. A suitable value for $T_6$ is 0.1.

In a still further post-processing stage, a frame which was not flagged but which lies within a range or region of generally contiguous flagged fade frames (a fade range), may be flagged as fade frame in order to enhance detection. In this stage, one or more isolated frames which were not flagged but which lie within a fade range are identified and then flagged as fade frames.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for compressing a fade within a sequence of digital motion video frames comprising the steps of:
   (a) selecting first and second frames from said sequence for processing;
   (b) determining a first luminosity difference value from said first and second frames;
   (c) detecting a fade within said sequence by comparing said first luminosity difference value to at least one predetermined threshold; and
   (d) compressing at least one of said selected frames in accordance with the result of step (c).

2. The method of claim 1, wherein step (a) comprises the steps of:
   i. selecting a frame from said sequence as a first region for processing; and
   ii. selecting a previous frame from said sequence as a second region for processing;
   step (b) comprises the steps of:
   i. calculating the mean of said first region;
   ii. calculating the mean of said second region;
   iii. determining the magnitude of the difference between the result of steps (i) and (ii); and
   iv. determining a relative mean change by dividing the magnitude of said difference by the means of said first region; and
   step (c) comprises the steps of:
   i. comparing said relative mean change to a first predetermined threshold; and
   ii. detecting a fade if said relative mean change exceeds said first predetermined threshold.

3. The method of claim 1, wherein said first luminosity difference value is determined by summing pixel values in said first frame, summing pixel values in said second frame, and determining the absolute value of the difference between said sums.

4. The method of claim 1, wherein said first luminosity difference value is determined by comparing said first and second frames on a pixel-by-pixel basis and summing the absolute value of the difference of each pair of compared pixels.

5. A method for processing a sequence of digital motion video frames having at least one flagged fade frame comprising the steps of:
   (a) determining whether said at least one flagged fade frame is a single fade frame;
   (b) if said at least one flagged fade frame is a single fade frame then
   i. calculating a relative mean change for said single fade frame;
   ii. comparing said relative mean change against a predetermined threshold; and
   iii. unflagging said single fade frame if the magnitude of said relative mean change is less than said predetermined threshold.

6. The method of claim 5 wherein said digital motion video sequence includes a plurality of flagged fade frames, said plurality of flagged fade frames defining at least one fade range, said method further comprising the steps of:
   (c) identifying at least one non-fade frame within said at least one fade range; and
   (d) flagging said at least one non-fade frame as a fade frame.

7. An apparatus for compressing a fade within a sequence of digital motion video frames comprising:
   (a) means for providing first and second frames from said sequence for processing;
   (b) means for determining at least one luminosity difference value from said first and second frames;
   (c) fade detector means for detecting a fade within said sequence by comparing said at least one luminosity difference value to at least one predetermined threshold; and
   (d) means for compressing at least one of said selected frames in accordance with the result of said fade detector means.

8. The apparatus of claim 7, wherein said means for providing first and second frames for processing comprises:
   i. means for providing a selected frame from said sequence as a first region for processing;
   ii. means for providing a previous frame from said sequence as a second region for processing;
   said means for determining at least one luminosity difference value comprises:
   i. first calculating means for calculating the means of said first region;
   ii. second calculating means for calculating the mean of said second region;
   iii. difference means for determining the magnitude of the difference between the means of said first region and the mean of said second region;
   iv. relative difference means for determining the relative mean change between said first region and said second region; and
   said fade detector means comprises:
   i. first comparing means for comparing said relative means change to a first predetermined threshold; and
   ii. means for detecting the presence of a fade if said relative mean change exceeds said first predetermined threshold.

9. The apparatus of claim 7, wherein said first luminosity difference value is the magnitude of the difference between the sum of the pixel values in said first frame and the sum of pixel values in said second frame.

10. The apparatus of claim 7, wherein said first luminosity difference value is a sum of the absolute value of differences determined by comparing said first and second frames on a pixel-by-pixel basis.

11. A apparatus for processing a sequence of digital motion video frames having at least one flagged fade frame comprising:
   (a) means for determining whether said at least one flagged fade frame is a single fade frame;
   (b) means for calculating a first luminosity difference value for a single fade frame;
   (c) means for comparing said first luminosity difference value against a predetermined threshold; and
   (d) means for unflagging said single fade frame if the magnitude of first luminosity difference value is less than said predetermined threshold.

12. The apparatus of claim 11, wherein said first luminosity difference value is the relative means change between said single fade frame and another frame in said sequence.

13. The apparatus of claim 12, wherein said digital motion video sequence includes a plurality of flagged fade frames, said plurality of flagged fade frames defining at least one fade range, said apparatus further comprising:
   (e) means for identifying at least one non-fade frame within said at least one fade range; and
   (f) means for flagging said at least one non-fade frame as fade frame.

14. A method for detecting a fade frame within a sequence of digital motion video frames comprising the steps of:
   (a) selecting a frame from said sequence as a first region for processing; and
   (b) selecting a previous frame from said sequence as a second region for processing;
   (c) calculating the means of said first region;
   (d) calculating the mean of said second region;
   (e) determining the magnitude of the difference between the results of steps (c) and (d);
   (f) determining a relative mean change between said first and second regions in accordance with the result of step (e);
   (g) comparing said relative means change to a first predetermined threshold;
   (h) detecting a fade if said relative means change exceeds a first predetermined threshold;
   (i) if a fade is detected in step (h) then:
      (1) dividing said selected frame and said previous frame into corresponding regions;
      (2) selecting a region from said selected frame as a first region for processing and a corresponding region in said previous frame as a second region for processing;
      (3) repeating steps (c) to (g);
      (4) if said relative mean change exceeds said first predetermined threshold, then incrementing a counter;
      (5) repeating steps (i) (1) to (i) (4) for remaining corresponding regions in said selected and previous frames; and
      (6) flagging said selected frame as a fade frame if said counter divided by the number of regions in said selected frame exceeds a predetermined percentage.

15. An apparatus for detecting a fade within a sequence of digital motion video frames comprising:

(a) means for providing a selected frame from said sequence as a first region for processing;
   (b) means for providing a previous frame from said sequence as a second region for processing;
   (c) first calculating means or calculating the mean of said first region;
   (d) second calculating means for calculating the mean of said second region;
   (e) difference means for determining the magnitude of the difference between the mean of said first region and the mean of said second region;
   (f) relative difference means for determining the relative mean change between said first region and said second region;
   (g) first comparing means for comparing said relative means change to a first predetermined threshold;
   (h) means for detecting the presence of a fade if said relative means change exceeds said first predetermined threshold;
   (i) frame dividing means for dividing said selected frame and said previous frame into corresponding regions;
   (j) means for selecting a region from said selected frame as a first region for processing;
   (k) means for selecting a region from said previous frame as a second region for processing;
   (l) means for incrementing a counter if the relative means change between said first region and said second region exceeds said first predetermined threshold; and
   (m) fade frame flagging means for flagging said selected frame as a fade frame if said counter divided by the number of regions in said selected frame exceeds a predetermined percentage.

16. A method for detecting a fade within a sequence of digital motion video frames comprising the steps of:
   (a) selecting first and second frames from said sequence for processing;
   (b) determining a first luminosity difference value between said first and second frames, and determining a second luminosity difference value between said first and second frames; and
   (c) detecting a fade by comparing said first luminosity difference value to at least one predetermined threshold and by comparing said second luminosity difference value to a second predetermined threshold.

17. The method of claim 16, wherein step (a) comprises the steps of:
   i. selecting a frame from said sequence as a first region for processing; and
   ii. selecting a previous frame from said sequence as a second region for processing;
   step (b) comprises the steps of:
   i. calculating the mean of said first region;
   ii. calculating the mean of said second region;
   iii. determining the magnitude of the difference between the result of steps (i) and (ii); and
   iv. determining a relative means change by dividing the magnitude of said difference by the mean of said first region; and
   step (c) comprises the steps of:
   i. comparing said relative mean change to a first predetermined threshold;
   ii. comparing said relative mean change to a second predetermined threshold, said second predetermined threshold being smaller than said first predetermined threshold;

iii. comparing the magnitude of said difference to a third predetermined threshold; and iv. detecting a fade if said relative mean change is between said first and second predetermined thresholds and the magnitude of said difference is greater than said third predetermined threshold.

18. The method of claim 17, further comprising the step of:
(d) if a fade is detected in step (c) (iv) then:
  i. dividing said selected frame and said previous frame into corresponding regions;
  ii. selecting a region from said selected frame as a first region for processing and a corresponding region in said previous frame as a second region for processing;
  iii. repeating steps (b) to (c) (iii);
  iv. if said relative mean change is between said first and second predetermined thresholds and the magnitude of said difference is greater than said third predetermined threshold, then incrementing a counter;
  v. repeating steps ii. to iv. for remaining corresponding regions in said selected and previous frames; and
  vi. flagging said selected frame as a fade frame if said counter divided by the number of regions in said selected frame exceeds a predetermined percentage.

19. The method of claim 16, wherein step (a) comprises the steps of:
  i. selecting a frame from said sequence as a first region for processing; and
  ii. selecting a previous frame from said sequence as a second region for processing;
step (b) comprises the steps of:
  i. calculating the mean of said first region;
  ii. calculating the mean of said second region;
  iii. determining the magnitude of the difference between the result of steps (i) and (ii); and
  iv. determining a relative mean change by dividing the magnitude of said difference by the means of said first region; and
step (c) comprises the steps of:
  i. comparing said relative means change to a first predetermined threshold;
  ii. comparing said relative means change to a second predetermined threshold, said second predetermined threshold being smaller than said first predetermined threshold;
  iii. comparing said difference to a third predetermined threshold; and
  iv. detecting a fade if said relative mean change is greater than said first predetermined threshold or if said relative means change is greater than said second predetermined threshold and the magnitude of said difference is greater than said third predetermined threshold.

20. The method of claim 19, further comprising the step of:
(d) if a fade is detected in step (c) (iv) then:
  i. dividing said selected frame and said previous frame into corresponding regions;
  ii. selecting a region from said selected frame as a first region for processing and a corresponding region in said previous frame as a second region for processing;
  iii. repeating steps (b) to (c) (iii);
  iv. if said relative mean change is greater than said first predetermined threshold or if said relative mean change is greater than said second predetermined threshold and the magnitude of said difference is greater than said third predetermined threshold, then incrementing a counter;
  v. repeating steps ii. to iv. for remaining corresponding regions in said selected and previous frames; and
  vi. flagging said selected frame as a fade frame if said counter divided by the number of regions in said selected frame exceeds a predetermined percentage.

21. The method of claim 19, wherein step (c) further comprises the steps of:
  i. comparing the mean of said first region with a fourth predetermined threshold, said second predetermined threshold being greater than said fourth predetermined threshold;
  ii. comparing the mean of said first region with a fifth predetermined threshold;
  iii. detecting a fade only if the mean of said first region is between said fourth and fifth thresholds.

22. An apparatus for detecting a fade within a sequence of digital motion video frames comprising:
(a) means for providing first and second frames from said sequence for processing;
(b) means for determining at least one luminosity difference value from said first and second frames, and means for determining a second luminosity difference value from said first and second frames; and
(c) fade detector means for detecting a fade by comparing said at least one luminosity difference value to at least one predetermined threshold and by comparing said second luminosity difference value to a second predetermined threshold.

23. The apparatus of claim 22, wherein said means for providing first and second frames for processing comprises:
  i. means for providing a selected frame from said sequence as a first region for processing;
  ii. means for providing a previous frame from said sequence as a second region for processing;
said means for determining at least one luminosity difference value and said second luminosity difference value comprise:
  i. first calculating means for calculating the mean of said first region;
  ii. second calculating means for calculating the mean of said second region;
  iii. difference means for determining the magnitude of the difference between the means of said first region and the mean of said second region;
  iv. relative difference means for determining the relative mean change between said first region and said second region; and
said fade detector means comprises:
  i. first comparing means for comparing said relative means change to a first predetermined threshold;
  ii. second comparing means for comparing said relative means change to a second predetermined threshold and for comparing said difference to a third predetermined threshold, said second predetermined threshold being smaller than said first predetermined threshold; and
  iii. means for detecting the presence of a fade if said relative mean change is between said first and second thresholds and the magnitude of said difference is greater than said third predetermined threshold.

24. The apparatus of claim 23, further comprising:
(d) frame dividing means for dividing said selected frame and said previous frame into corresponding regions;
(e) means for selecting a region from said selected frame as a first region for processing;
(f) means for selecting a region from said previous frame as a second region for processing;
(g) means for incrementing a counter if said relative mean change is between said first and second thresholds and the magnitude of said difference is greater than said third predetermined threshold; and
(h) fade frame flagging means for flagging said selected frame as a fade frame if said counter divided by the number of regions in said selected frame exceeds a predetermined percentage.

25. The apparatus of claim 22, wherein said means for providing first and second frames for processing comprises:
  i. means for providing a selected frame from said sequence as a first region for processing;
  ii. means for providing a previous frame from said sequence as a second region for processing;
said means for determining at least one luminosity difference value and said second luminosity difference value comprise:
  i. first calculating means for calculating the mean of said first region;
  ii. second calculating means for calculating the mean of said second region;
  iii. difference means for determining the magnitude of the difference between the mean of said first region and the mean of said second region;
  iv. relative difference means for determining the relative mean change between said first region and said second region; and said fade detector means comprises:
  i. first comparing means for comparing said relative means change to a first predetermined threshold; and
  ii. second comparing means for comparing said relative mean change to a second predetermined threshold and for comparing the magnitude of said difference to a third predetermined threshold, said second predetermined threshold being smaller than said first predetermined threshold; and
  iii. means for detecting the presence of a fade if said relative mean change is greater than said first predetermined threshold or if said relative mean change is between said first and second thresholds and the magnitude of said difference is greater than said third predetermined threshold.

26. The apparatus of claim 25, further comprising:
(d) frame dividing means for dividing said selected frame and said previous frame into corresponding regions;
(e) means for selecting a region from said selected frame as a first region for processing;
(f) means for selecting a region from said previous frame as a second region for processing;
(g) means for incrementing a counter if said relative mean change is greater than said first predetermined threshold or if said relative mean change is between said first and second thresholds and the magnitude of said difference is greater than said third predetermined threshold; and
(h) fade frame flagging means for flagging said selected frame as a fade frame if said counter divided by the number of regions in said selected frame exceeds a predetermined percentage.

27. The apparatus of claim 26, wherein said fade detector means detects a fade only if the mean of said first region is between fourth and fifth predetermined thresholds.

* * * * *